(12) United States Patent
Holder

(10) Patent No.: US 7,476,641 B2
(45) Date of Patent: Jan. 13, 2009

(54) CHEMICAL ABSORBENT

(75) Inventor: Michael John Holder, Oxfordshire (GB)

(73) Assignee: Intersurgical AG, Vaduz (LI)

( * ) Notice: Subject to any disclaimer, the term of this patent is extended or adjusted under 35 U.S.C. 154(b) by 0 days.

(21) Appl. No.: 10/399,457

(22) PCT Filed: Oct. 19, 2001

(86) PCT No.: PCT/GB01/04673

§ 371 (c)(1),
(2), (4) Date: Oct. 14, 2003

(87) PCT Pub. No.: WO02/32493

PCT Pub. Date: Apr. 25, 2002

(65) Prior Publication Data

US 2004/0053782 A1 Mar. 18, 2004

(30) Foreign Application Priority Data

Oct. 19, 2000 (GB) .................................. 0025624.8

(51) Int. Cl.
*B01J 20/00* (2006.01)
(52) U.S. Cl. ...................................................... 502/400
(58) Field of Classification Search ................. 502/400, 502/405, 407, 410, 439
See application file for complete search history.

(56) References Cited

FOREIGN PATENT DOCUMENTS

| DE | 197 40 736 A | | 3/1999 |
|----|---|---|---|
| EP | 0 393 964 A | | 10/1990 |
| EP | 0 530 731 A | | 3/1993 |
| JP | 58 177137 A | | 10/1983 |
| JP | 59-205943 | * | 11/1984 |
| JP | 61 293546 A | | 12/1986 |
| JP | 07-185319 | * | 7/1995 |
| JP | 09-313932 | * | 12/1997 |
| WO | WO 98 17385 A | | 4/1998 |
| WO | WO 98 23370 A | | 6/1998 |

* cited by examiner

Primary Examiner—Edward M Johnson
(74) Attorney, Agent, or Firm—Nixon Peabody LLP

(57) ABSTRACT

A chemical absorbent comprises a hydrated mixture of a major proportion of a pharmaceutically acceptable hydroxide of a Group II metal and a minor proportion of silica, the chemical absorbent being substantially free of Group I metal ions. The chemical absorbent is particularly useful in low flow or closed circuit anaesthesia, and is advantageous in that it does not react with volatile anaesthetic agents in such a way as to cause the build up of toxic substances within an anaesthetic breathing circuit.

18 Claims, 1 Drawing Sheet

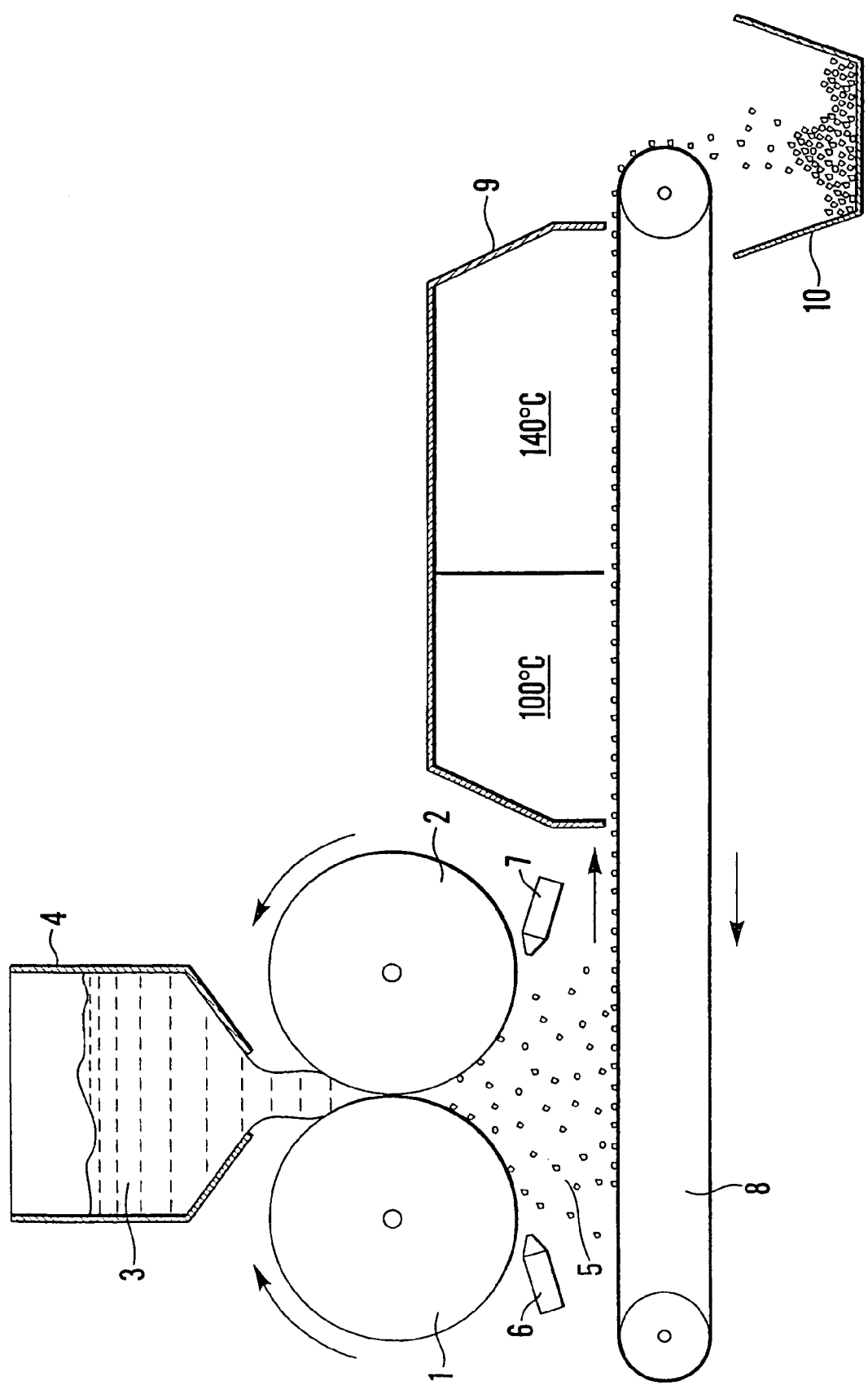

CHEMICAL ABSORBENT

This invention relates to a chemical absorbent, and in particular to an absorbent for carbon dioxide which is useful in low flow or closed circuit anaesthesia.

Chemical absorbents are used to remove one or more molecular species from a medium, for example to remove specific molecular species from mixtures of gases. Soda lime is one such chemical absorbent and is widely used to absorb carbon dioxide, for instance in anaesthetic breathing systems and other applications involving air which is to be breathed.

In order to make chemically active soda lime, calcium hydroxide is mixed with sodium hydroxide and/or potassium hydroxide to produce a caustic lime mixture containing water. The ratio of the components in the caustic lime mixture is typically 96-98% by weight calcium hydroxide to 2-4% by weight sodium and/or potassium hydroxide. The finished product typically contains 81-87% w/w caustic lime mixture and 13-19% w/w water. In addition, a pH sensitive indicator dye is normally present to give a visual indication of the extent of usage and exhaustion. This indicator dye is present in the caustic lime mixture at very low levels, typically 0.01-0.1% w/w.

Though first introduced early in the twentieth century, soda lime remains the most widely used carbon dioxide absorbent for use in anaesthesia. However, its use is accompanied by certain disadvantages or concerns.

A major concern in the field of anaesthesia in recent years has been unwanted reactions between volatile anaesthetic agents and the soda lime absorbent. If these interactions occur to a great enough extent they can lead to low levels of potentially toxic compounds building up in the patient breathing circuit. The levels are very low, but nevertheless there is a growing awareness of the issue and increasing concern amongst anaesthetists. These degradation products are of most concern when the soda lime has been allowed to become excessively dry. This rarely happens in normal use but there are certain practices under which it can occur. Two compounds of particular concern are carbon monoxide and $CF_2=C(CF_3)OCH_2F$, which is known as "Compound A". The latter compound is a degradation product of the new anaesthetic agent "Sevoflurane".

Another issue in the use of soda lime is colour regeneration. Soda lime is normally formulated with a pH-sensitive dye which changes colour when the soda lime becomes exhausted.

"White-to-violet" soda lime, for instance, contains ethyl violet. The structure of the ethyl violet changes when the pH of its environment falls below pH 10. In fresh white-to-violet soda lime (pH 13.5), the ethyl violet does not show any colour because the light absorption frequency is outside the visible spectrum and so the soda lime is white (the colour of calcium hydroxide). As the soda lime becomes exhausted, the pH drops below pH 10 and at this point the ethyl violet eliminates a hydroxyl ion. The very small positive charge that is left behind on the ethyl violet molecule becomes "delocalised". This delocalisation causes a shift of the light absorption frequency of the molecule into the visible spectrum, leading to the violet colour in exhausted soda lime.

"Pink-to-white" soda lime changes colour in the same way. However, the dye in this form of the product shows its colour above pH 10 and not below, and therefore the product is pink when fresh and white when exhausted.

Colour regeneration occurs with all soda lime products. The colour change of ethyl violet is not a permanent change but instead depends on the pH of its environment being below pH 10. If this pH rises above pH 10, then the positively charged ethyl violet molecule will regain its hydroxyl ion and become colourless once again.

During the use of soda lime to absorb carbon dioxide, sodium hydroxide (or potassium hydroxide) is consumed in one reaction but then regenerated during a later reaction. At the point of exhaustion of soda lime, regeneration of sodium hydroxide (or potassium hydroxide if present) occurs too slowly to keep up with its consumption earlier in the absorption reactions. Therefore, the level of sodium hydroxide (or potassium hydroxide) falls and so the pH falls. Absorption begins to fail and the soda lime turns violet.

When the soda lime is exhausted and no longer in use there are no absorption reactions to consume the sodium hydroxide (or potassium hydroxide if present). However, even in exhausted soda lime the sodium hydroxide (or potassium hydroxide) is able to regenerate slowly. Therefore, the level of sodium hydroxide (or potassium hydroxide) slowly rises and so does the pH. Above pH 10, the ethyl violet once again becomes colourless. The same mechanism is at work in the colour reversal of exhausted "pink-to-white" soda lime.

This regeneration of the original colour does not indicate a regeneration of the absorbency of the product. When the soda lime (white-to-violet) has shown a violet colour, it is because virtually all the calcium hydroxide has been used up and there is no activity left in the product.

The regeneration of the original colour in exhausted soda lime is regarded as a problem by most anaesthetists in that exhausted soda lime may be mistaken for fresh product. Subsequent use will result in rapid carbon dioxide breakthrough and may lead to a need to change soda lime in the middle of an anaesthetic procedure.

Another problem that occurs with soda lime formulations is that dust and fine particles are formed as a result of the friability and breakdown of the product. The presence of such dust is highly undesirable, particularly when the product is intended for use in anaesthetic (or other) breathing systems since the fine particles may be inhaled. International Patent Application WO 98/17385 discloses formulations which address this problem. These formulations contain a small proportion of zeolite which increases the mechanical strength of the soda lime granules. However, these formulations also contain conventional proportions of sodium and/or potassium hydroxide.

There has now been devised a chemical absorbent which overcomes or substantially mitigates the above-mentioned and/or other disadvantages.

According to the invention, there is provided a chemical absorbent comprising a hydrated mixture of a major proportion of a pharmaceutically acceptable hydroxide of a Group II metal and a minor proportion of silica, the chemical absorbent being substantially free of Group I metal ions.

The chemical absorbent according to the invention is advantageous primarily in that it does not react with volatile anaesthetic agents in such a way as to cause the build up of toxic substances (in particular the toxic substances carbon monoxide and "Compound A") within an anaesthetic breathing circuit containing anaesthetic agents such as those known as sevoflurane, desflurane, isoflurane, enflurane and halothane. The absorbent is also beneficial in that when formulated so as to indicate exhaustion by a colour change, the colour change persists for a protracted period and does not in that period revert to a colour confusable with that of fresh product.

The pharmaceutically acceptable hydroxide is preferably insoluble or only sparingly soluble in water, and has a high capacity for carbon dioxide absorption.

The pharmaceutically acceptable hydroxide is most preferably calcium hydroxide.

The proportions of the pharmaceutically acceptable hydroxide and the silica may vary within quite wide ranges. The hydroxide preferably accounts for 65% to 95% by weight of the formulation, more preferably 75% to 79%, and the silica between 4% and 20% by weight, more preferably 5% to 10%. The formulation typically contains between 10% and 20% by weight of water, more preferably 12% to 16%.

The chemical absorbent according to the invention preferably consists essentially of the hydroxide of a Group II metal, silica and water, other components such as pH-sensitive dye and/or other pigments being present only in trace amounts, typically less than 1% w/w and more preferably less than 0.5% or 0.1% w/w.

In preferred embodiments, the chemical absorbent according to the invention consists solely of the hydroxide of a Group II metal, silica, water, and one or more pH-sensitive dyes and/or other pigments, the dyes and/or pigments accounting for less than 1% w/w of the composition, more preferably less than 0.5% or 0.1% w/w.

The silica is most preferably an amorphous, precipitated synthetic silica. This confers upon the absorbent a highly porous structure. The porosity thus achieved allows the product to have good chemical absorption properties, despite the absence of catalytic input from an alkali hydroxide. A very high degree of porosity would be expected to result in poor physical stability. However, it is found that the precipitated silica provides a high degree of physical stability to the product even though the structure is highly porous. The use of precipitated synthetic silica is preferred as such material is prepared under controlled conditions which ensure that the crystal structure is uniform, the crystals being of relatively uniform size and regular shape, leading to a matrix structure with optimum absorbency characteristics. Suitable precipitated synthetic silicas are available from Crosfield Ltd, Warrington, England. A particular grade of synthetic amorphous silica that has been found to be useful in the invention is that sold by Crosfield under the trade name Sorbosil TC15.

In order to provide a visual indication of exhaustion the absorbent according to the invention preferably includes a pH-sensitive dye. Such a dye will generally be present at very low levels, typically 0.001% to 0.1% by weight. As the invention allows a permanent drop in pH to be achieved at the point of chemical exhaustion, the indicator dye allows a permanent visual indication of exhaustion to be achieved. The nature of the colour change may, if desired, be modified by incorporation of a pigment in the formulation. For example, trace levels (say around 0.05%) of the pigment sold as EXP GREEN DISP (JKM9/53) by Holliday Dispersions—Kenroy Ltd (Holt Mill Road, Waterfoot, Rossendale, Lancashire BB4 7JB, United Kingdom), which is an aqueous dispersion of Cl Pigment Yellow 13 and Cl Pigment Green 7, confer on the fresh product a green colour which is replaced by violet upon exhaustion.

By the term "substantially free of hydroxides of Group I metals" is meant that the formulation contains a sufficiently low concentration of any such hydroxides for there to be no significant danger of interaction between such hydroxides and any anaesthetic agents with which the chemical absorbent is used. In quantitative terms, "substantially free of hydroxides of Group I metals" may mean that the formulation contains less than 0.5% w/w of such hydroxides, more preferably less than 0.1% w/w.

The chemical absorbent according to the invention is most preferably used in the form of granules. Such granules may have any suitable shape, but are preferably cylindrical or, most preferably, spherical or substantially spherical (eg biconvex). In other embodiments, the chemical absorbent may be incorporated into components such as filter membranes or formed into monolithic solid blocks.

The chemical absorbent according to the invention may be prepared by mixing the pharmaceutically acceptable hydroxide and the silica, adding water to form a paste, and then extruding or moulding the paste to form granules. The granules are then dried to the desired water content. In some cases, it may be advantageous to dry the granules to a lower water content (eg complete or substantially complete dryness) and then to rehydrate to the desired final water level.

The chemical absorbent of the present invention, and a method for its manufacture, will now be described in greater detail, by way of illustration only, with reference to the following Example and the accompanying drawing.

EXAMPLE

| | |
|---|---|
| Calcium hydroxide | 77% w/w |
| Precipitated synthetic silica | 8% w/w |
| Water | 15% w/w |
| pH sensitive indicator dye | Trace (approx 0.03% w/w) |

The required quantities of calcium hydroxide, silica and indicator dye (all in the form of fine powders) are mixed to form a homogeneous powder mix.

Sufficient water is added, with mixing, to form a homogeneous stiff paste.

Before the above paste is processed it has been found to be beneficial to allow a dwell time of 20 to 60 minutes, during which the paste hardens to a stiffer consistency.

BRIEF DESCRIPTION OF THE DRAWING

The FIGURE is a schematic diagram of a processor in accordance with the present invention.

The processor comprises two counter rotating and touching rollers 1,2. The direction of rotation of the rollers 1,2 at the point where they touch is such that the surface of both rollers 1,2 has a downward motion.

Each roller 1,2 is profiled with hemispherical cavities, each cavity being of the same diameter. Depending on the product to be made, this may be, for example, 3, 3.5 or 4 mm. The hemispherical cavities are arranged in a hexagonal close packed arrangement.

The profiled surface and relative movement of the two touching rollers 1,2 are synchronised such that at the point at which the surfaces of the two rollers 1,2 meet, a row of completely spherical moulds are created from the two facing rows of hemispheres. The speed of rotation of the two rollers 1,2 is synchronised and can be varied between 0 and 30 revolutions per minute.

Paste 3 is fed in lumps into a feed hopper 4 mounted on top of the processor such that the paste 3 is resting on the downwardly rotating surfaces of the rollers 1,2. In an alternative arrangement, the paste is formed into a sheet that is fed between the rollers.

The motion of the rollers draws paste down between them at the point where they touch. Paste is thus squeezed and forced to fill the spherical moulds as they form.

As the rollers rotate, the spherical cavities re-open exposing a row of moulded paste spheres 5. These spheres 5 generally do not drop out of the processor under their own weight, instead they stick inside one or the other of the two hemispherical cavities from which they were moulded. There is no factor influencing which roller cavity the moulded spheres 5 stick to and so the result is that both rollers as they rotate from the underside have half of their profiled pits empty while the other half are full of moulded spheres.

The profiled cavities on the surface of the rollers must be emptied of the moulded paste spheres 5 in order that they are available to take up more paste the next time around. Therefore, an ejection mechanism is necessary to remove the moulded spheres 5 from the cavities.

Air knives 6,7 are mounted adjacent each roller 1,2 such that a blade of high velocity and energetic air is directed at a tangent to the surface of the rollers 1,2 down their entire length.

As the rollers 1,2 rotate, the rows of cavities filled with moulded spheres 5 come into line with the blade of air that hits the side of the moulded spheres 5 thus ejecting them from the cavities.

A conveyor belt 8 starting a sufficient distance behind the processor passes under it, collecting spheres 5 as they drop. The moulded spheres 5 travel along the conveyor and into a continuous belt oven 9.

The first drying stage is a gentle drying at around 100° C. during which the majority of the water is removed from the product. This low temperature stage is believed to prevent rapid drying which could create stress within the structure, reducing the subsequent physical strength of the product.

The second drying stage is at an elevated temperature of around 140° C. In this stage the product is completely dried to less than 1% water. This level of dryness is important as it allows for bonding to take place between microscopic particles within the spheres 5 (it is believed that as the dissolved ions come out of solution they form bonds between the particles).

On exiting the oven 9, the dried spheres 5 are tipped from the conveyor belt 8 and are collected in a suitable receptacle 10.

During the formation of soda lime spheres 5 by the invented process, some of the spheres are found to possess a slight "moulding seam" around the circumference. Although the dusting of this finished product is already low this "moulding seam" may present a region of increased friability on the sphere. It has been found to be beneficial to include a de-dusting stage in the production process, The de-duster comprises a rotating cylinder made from perforated steel sheet. The size and pitch of the perforations are such that only fine particles and dust are allowed to fall through while the spheres remain in the cylinder. The speed of rotation of the de-dusting cylinder is between 30 and 60 revolutions per minute.

The completely dried spheres are introduced into the de-duster. As the spheres begin to tumble they settle into a stable flowing cyclic motion. As they do so, the spheres roll against one another creating an abrasive affect which causes the pieces of "flash" or moulding "seam" to be broken off. After a sufficient time the spheres are smoothed while the generated dust falls through the perforations and is thus separated from the product. The resulting product possesses a significantly reduced friability since any irregularities have been removed.

The final product contains a level of water of 15%. The drying process described above completely dries the product in order to create physical strength. Water is then added back into the product by adding the necessary quantity of water to the dry product which is then mechanically agitated for a sufficient time to disperse the water. The product is then sealed in an airtight container until complete equilibrium of the moisture has taken place.

The product may contain partially formed spheres and/or fine particles created during the wetting back process. In order to remove these, the product is sieved over a suitable screen before packing.

Alternatively, other manufacturing processes may be used. For instance, the paste may be extruded through a perforated plate or die to form elongate rods which are dried and then broken down to form granules.

Experimental Studies

Studies were conducted to confirm the elimination of anaesthetic degradation by the chemical absorbent according to the invention. Two experiments were conducted, one to test for the generation of carbon monoxide and the other for generation of Compound A.

In each case, the performance of the following absorbents was measured and compared:

Absorbent A—the chemical absorbent according to the present invention

Absorbent B—a chemical absorbent as described in WO 98/17385

Absorbent C—a conventional soda lime formulation

Testing for the Generation of Carbon Monoxide

In order to examine the levels of carbon monoxide generated by the various absorbents a comprehensive study was conducted in which all absorbents were subjected to identical treatment, as follows:

a) The absorbents (initial moisture contents 14-17% w/w) were dried in an oven at 150° C. for four hours. As a result of this treatment, all the materials were completely dried to less than 0.5% water by weight.

b) The dried samples were placed in a sealed container and conditioned at the required test temperature for a minimum of three hours, by which time stabilisation was achieved.

c) The absorbent was filled into an Intersurgical "Clear Flo" absorber (630 $cm^3$), making sure that optimum bed packing was achieved.

d) A 2 I/min flow of dry oxygen (20-23° C.) containing 5% Isoflurane was passed through the absorbent.

e) The test rig was assembled as an open circuit (no recycling). This enabled direct measurement of carbon monoxide emerging from the absorbent rather than an accumulative build-up.

f) The gas emerging from the absorbent was analysed for carbon monoxide using a Belfont Technical Instruments EC50 carbon monoxide monitor.

Testing for the Generation of Compound A

In order to examine the levels of Compound A generated by the various absorbents a comprehensive study was conducted in which all absorbents were subjected to identical treatment, as follows:

a) The absorbent was filled into an Intersurgical "Clear Flo" absorber (630 $cm^3$), making sure that optimum bed packing was achieved.

b) A 1 I/min flow of dry oxygen (20-23° C.) containing 2% Sevoflurane was passed through the absorbent.

c) The test rig was assembled as an open circuit (no recycling). This enabled direct measurement of Compound A emerging from the absorbent rather than an accumulative build-up.

d) Gas samples were taken every 10 minutes and analysed by gas chromatography. Calibration was achieved using a control standard of Compound A at 37 ppm.

Results a) Carbon Monoxide Generation

The level of carbon monoxide (ppm) measured for each absorbent as a function of time is shown in Table I.

b) Compound A Generation

The level of Compound A (ppm) measured for each fresh absorbent as a function of time is shown in Table II, and for each absorbent after complete drying in Table III. In each case, the level of Compound A present in the parent Sevoflurane is also shown for comparison.

Conclusions

The absorbent according to the present invention generates negligible carbon monoxide when totally dry, It also showed negligible Compound A generation even when totally dry, the levels measured being barely above those detected in the parent flow of Sevoflurane.

The prior absorbents B and, to a markedly greater extent, C generate carbon monoxide when totally dry and Compound A when fresh or dry.

TABLE I

| | Carbon monoxide level/ppm | | |
|---|---|---|---|
| Time/mins | Absorbent A | Absorbent B | Absorbent C |
| 0 | 0 | 0 | 0 |
| 1 | 0 | 11 | 82 |
| 2 | 0 | 36 | 449 |
| 3 | 1 | 62 | 579 |
| 4 | 4 | 89 | 595 |
| 6 | 8 | 132 | 284 |
| 8 | 5 | 129 | 182 |
| 10 | 4 | 113 | 126 |
| 12 | 3 | 99 | 94 |
| 14 | 3 | 90 | 81 |
| 16 | 2 | 82 | 63 |
| 18 | 2 | 76 | 58 |
| 20 | 1 | 72 | 51 |
| 22 | 1 | 69 | 46 |
| 24 | 1 | 66 | 41 |
| 26 | 1 | 63 | 37 |
| 28 | 1 | 60 | 34 |
| 30 | 1 | 58 | 32 |

TABLE II

| | Compound A level/ppm | | | |
|---|---|---|---|---|
| Time/mins | Absorbent A (15% water) | Absorbent B (15% water) | Absorbent C (16% water) | Parent Sevoflurane |
| 10 | 1.0 | 8.7 | 13.5 | 0.5 |
| 20 | 1.1 | 9.6 | 15.0 | 0.6 |
| 30 | 1.0 | 9.3 | 18.5 | 0.6 |
| 40 | 1.2 | 9.9 | 17.9 | 0.5 |
| 50 | 1.2 | 9.3 | 17.8 | 0.6 |
| 60 | 1.2 | 8.6 | 18.1 | 0.5 |

TABLE III

| | Compound A level/ppm | | | |
|---|---|---|---|---|
| Time/mins | Absorbent A (dry) | Absorbent B (dry) | Absorbent C (dry) | Parent Sevoflurane |
| 10 | 2.1 | 1.4 | 1.7 | 0.5 |
| 20 | 2.2 | 19.1 | 32.7 | 0.6 |
| 30 | 1.7 | 20.0 | 44.1 | 0.6 |
| 40 | 1.3 | 19.8 | 53.2 | 0.5 |
| 50 | 1.0 | 19.4 | 51.8 | 0.6 |
| 60 | 1.3 | 19.1 | 49.7 | 0.5 |

The invention claimed is:

1. A chemical absorbent consisting essentially of a hydrated mixture of a pharmaceutically acceptable hydroxide of a Group II metal at a level of between 65% and 95% by weight of the chemical absorbent, silica at a level of between 5% and 10% by weight of the chemical absorbent, and water, the chemical absorbent being substantially free of Group I metal ions.

2. A chemical absorbent as claimed in claim 1, which contains less than 0.5% w/w of Group I metal hydroxides.

3. A chemical absorbent as claimed in claim 1, wherein the pharmaceutically acceptable hydroxide is insoluble or only sparingly soluble in water.

4. A chemical absorbent as claimed in claim 1, wherein the pharmaceutically acceptable hydroxide is calcium hydroxide.

5. A chemical absorbent as claimed in claim 1, wherein the pharmaceutically acceptable hydroxide accounts for 75% to 79% by weight of the chemical absorbent.

6. A chemical absorbent as claimed in claim 1, which contains between 10% and 20% by weight of water.

7. A chemical absorbent as claimed in claim 1, which contains between 12% and 16% by weight of water.

8. A chemical absorbent as claimed in claim 1, in which other components are present only in amounts of less than 1% w/w.

9. A chemical absorbent as claimed in claim 1, which consists solely of the hydroxide of a Group II metal, silica, water, and one or more pH-sensitive dyes and/or other pigments, the dyes and/or pigments accounting for less than 1% w/w of the composition.

10. A chemical absorbent as claimed in claim 1, wherein the silica is a precipitated synthetic silica.

11. A chemical absorbent as claimed in claim 1, which further comprises a pH-sensitive dye.

12. A chemical absorbent as claimed in claim 11, wherein the pH-sensitive dye is present at a level of 0.001% to 0.1% by weight.

13. A chemical absorbent as claimed in claim 1, which further comprises a pigment.

14. A chemical absorbent as claimed in claim 1, which is in the form of granules.

15. A chemical absorbent as claimed in claim 14, wherein the granules are cylindrical, spherical or substantially spherical.

16. A process for the manufacture of a chemical absorbent as claimed in claim 1, which process comprises the steps of
    a) mixing the pharmaceutically acceptable hydroxide and the silica,
    b) adding water to form a paste, and
    c) extruding or moulding the paste to form granules.

17. A process as claimed in claim 16, further comprising drying the granules.

18. A process as claimed in claim 17, wherein the granules are dried to a lower than desired water content and then rehydrated to a desired final water level.

* * * * *